US012606320B2

(12) United States Patent
Haugeberg et al.

(10) Patent No.: US 12,606,320 B2
(45) Date of Patent: Apr. 21, 2026

(54) DEVICES AND METHODS TO VERIFY MAIN ROTOR SWASHPLATE POSITIONING

(71) Applicant: Textron Innovations Inc., Providence, RI (US)

(72) Inventors: Chad R. Haugeberg, Arlington, TX (US); Bradley D. Linton, Mansfield, TX (US)

(73) Assignee: Textron Innovations Inc., Providence, RI (US)

( * ) Notice: Subject to any disclaimer, the term of this patent is extended or adjusted under 35 U.S.C. 154(b) by 411 days.

(21) Appl. No.: 18/211,177

(22) Filed: Jun. 16, 2023

(65) Prior Publication Data

US 2023/0331400 A1      Oct. 19, 2023

Related U.S. Application Data

(63) Continuation of application No. 17/222,967, filed on Apr. 5, 2021, now Pat. No. 11,685,553, which is a continuation of application No. 16/182,442, filed on Nov. 6, 2018, now Pat. No. 10,967,990.

(60) Provisional application No. 62/658,205, filed on Apr. 16, 2018.

(51) Int. Cl.
| | |
|---|---|
| *B64C 27/00* | (2006.01) |
| *B64F 5/60* | (2017.01) |
| *G07C 5/08* | (2006.01) |

(52) U.S. Cl.
CPC .................. *B64F 5/60* (2017.01); *G07C 5/08* (2013.01); *B64C 27/00* (2013.01); *G07C 2205/02* (2013.01)

(58) Field of Classification Search
CPC ......... B64F 5/60; G07C 5/08; G07C 2205/02; B64C 27/00; B64C 27/008
USPC ........................................... 33/645
See application file for complete search history.

(56) References Cited

U.S. PATENT DOCUMENTS

| | | | | |
|---|---|---|---|---|
| 1,558,678 A * | 10/1925 | Koenig | ................... | B44C 7/025 |
| | | | | 33/567 |
| 2,607,124 A * | 8/1952 | Dery | ...................... | G01B 3/303 |
| | | | | 33/567.1 |
| 4,584,774 A * | 4/1986 | Link | ........................ | G01B 3/30 |
| | | | | 33/633 |
| 6,094,831 A * | 8/2000 | Shigyo | ..................... | G01B 5/14 |
| | | | | 33/542 |
| 6,644,081 B1 * | 11/2003 | Berry | ........................ | B64F 5/10 |
| | | | | 29/889.6 |
| 10,967,990 B2 * | 4/2021 | Haugeberg | .............. | B64C 27/54 |
| 2009/0223073 A1 * | 9/2009 | Tu | .......................... | A63H 27/12 |
| | | | | 33/534 |
| 2013/0240663 A1 * | 9/2013 | Lohr | ..................... | B64C 27/605 |
| | | | | 244/17.25 |
| 2016/0031557 A1 * | 2/2016 | Bammer | .............. | B64C 27/605 |
| | | | | 416/109 |

(Continued)

*Primary Examiner* — Peter J Macchiarolo
*Assistant Examiner* — Anna Josephine Saunders
(74) *Attorney, Agent, or Firm* — Akona IP PC

(57) ABSTRACT

A device to verify main rotor swashplate positioning includes an inner surface of a first section and a gradient surface of a second section. The gradient surface of the second section may have a plurality of graduation indications. In one implementation, the inner surface of the first section at least partially defines a travel arc that is parallel to and concentric with the inner surface. In such an implementation, the device may be configured to move along the travel arc as it rotates about a collective sleeve to contact a swashplate lug.

20 Claims, 6 Drawing Sheets

(56) References Cited

U.S. PATENT DOCUMENTS

2023/0331400 A1 * 10/2023 Haugeberg ................ B64F 5/40

* cited by examiner

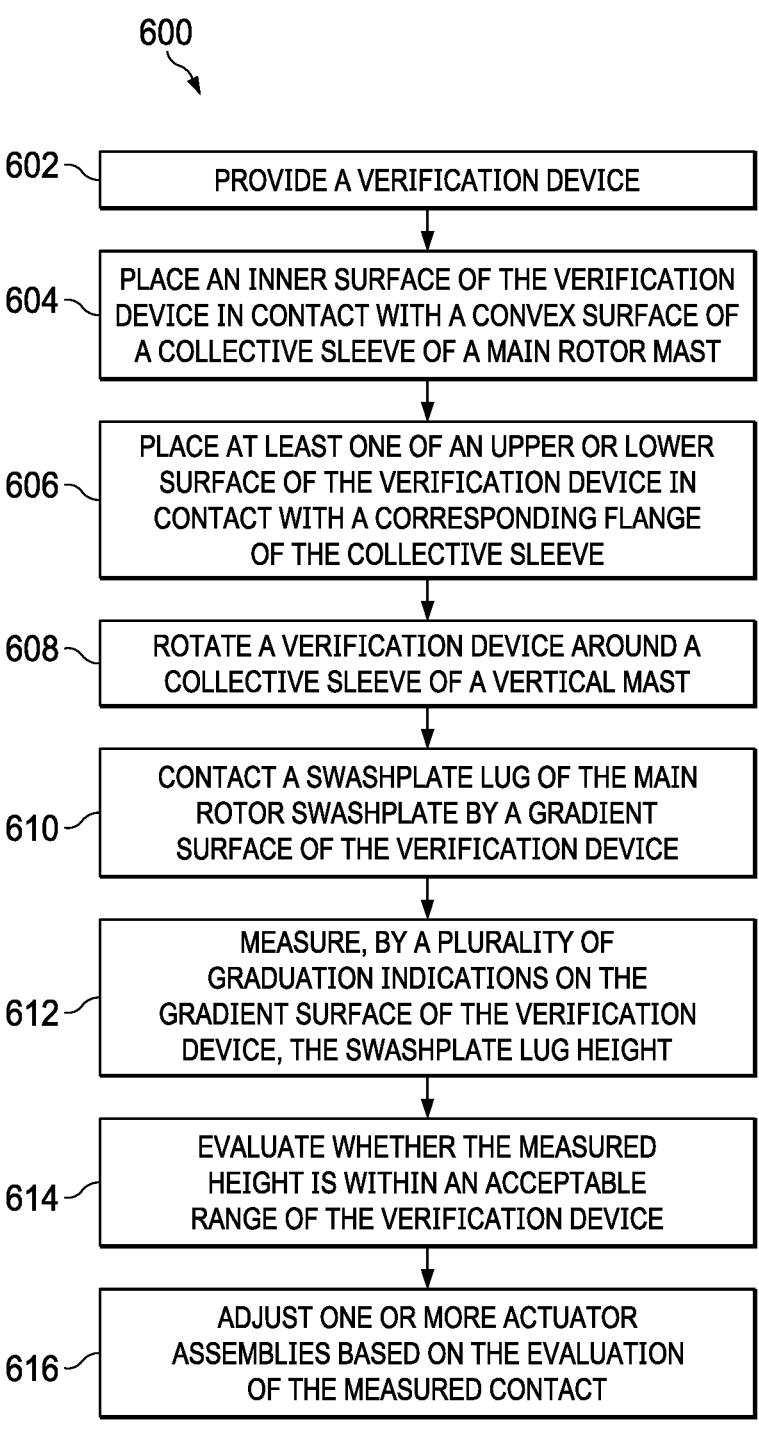

600

602 — PROVIDE A VERIFICATION DEVICE

604 — PLACE AN INNER SURFACE OF THE VERIFICATION DEVICE IN CONTACT WITH A CONVEX SURFACE OF A COLLECTIVE SLEEVE OF A MAIN ROTOR MAST

606 — PLACE AT LEAST ONE OF AN UPPER OR LOWER SURFACE OF THE VERIFICATION DEVICE IN CONTACT WITH A CORRESPONDING FLANGE OF THE COLLECTIVE SLEEVE

608 — ROTATE A VERIFICATION DEVICE AROUND A COLLECTIVE SLEEVE OF A VERTICAL MAST

610 — CONTACT A SWASHPLATE LUG OF THE MAIN ROTOR SWASHPLATE BY A GRADIENT SURFACE OF THE VERIFICATION DEVICE

612 — MEASURE, BY A PLURALITY OF GRADUATION INDICATIONS ON THE GRADIENT SURFACE OF THE VERIFICATION DEVICE, THE SWASHPLATE LUG HEIGHT

614 — EVALUATE WHETHER THE MEASURED HEIGHT IS WITHIN AN ACCEPTABLE RANGE OF THE VERIFICATION DEVICE

616 — ADJUST ONE OR MORE ACTUATOR ASSEMBLIES BASED ON THE EVALUATION OF THE MEASURED CONTACT

FIG. 5

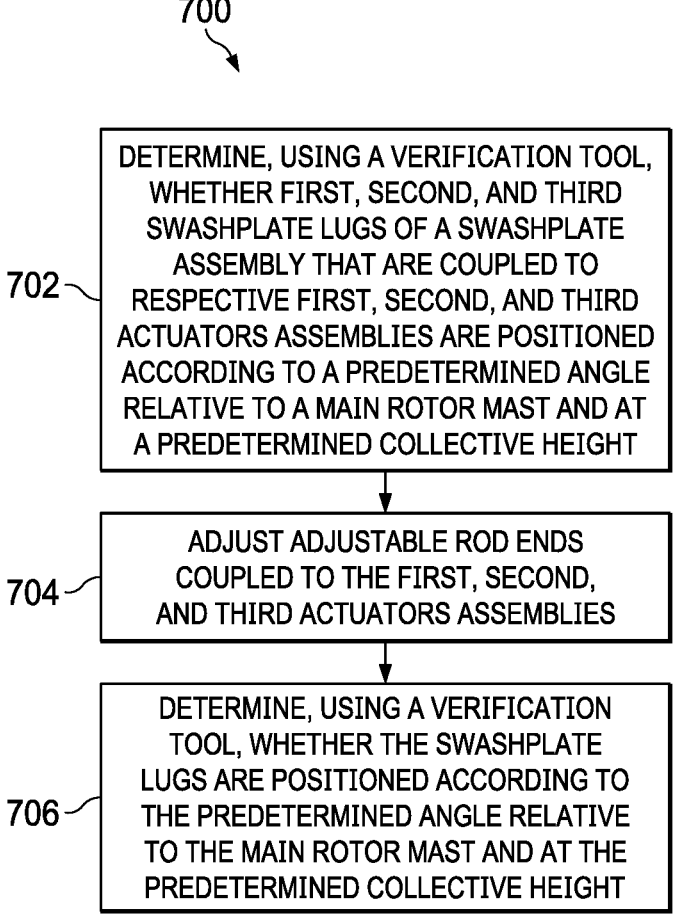

700

702 — DETERMINE, USING A VERIFICATION TOOL, WHETHER FIRST, SECOND, AND THIRD SWASHPLATE LUGS OF A SWASHPLATE ASSEMBLY THAT ARE COUPLED TO RESPECTIVE FIRST, SECOND, AND THIRD ACTUATORS ASSEMBLIES ARE POSITIONED ACCORDING TO A PREDETERMINED ANGLE RELATIVE TO A MAIN ROTOR MAST AND AT A PREDETERMINED COLLECTIVE HEIGHT

704 — ADJUST ADJUSTABLE ROD ENDS COUPLED TO THE FIRST, SECOND, AND THIRD ACTUATORS ASSEMBLIES

706 — DETERMINE, USING A VERIFICATION TOOL, WHETHER THE SWASHPLATE LUGS ARE POSITIONED ACCORDING TO THE PREDETERMINED ANGLE RELATIVE TO THE MAIN ROTOR MAST AND AT THE PREDETERMINED COLLECTIVE HEIGHT

FIG. 6

DEVICES AND METHODS TO VERIFY MAIN ROTOR SWASHPLATE POSITIONING

CROSS-REFERENCE TO RELATED APPLICATIONS

This application is a continuation of patent application Number U.S. Ser. No. 17/222,967 filed 2021 Apr. 5, which is a continuation of patent application Number U.S. Ser. No. 16/182,442, filed 2018 Nov. 6 and now patent Number U.S. Ser. No. 10/967,990, which claims benefit of patent application Number U.S. 62/658,205 filed 2018 Apr. 16. Each of the aforementioned related patent applications is herein incorporated by reference.

BACKGROUND

A rotorcraft (e.g., a helicopter) main rotor or rotor system is the combination of several rotary wings (i.e., rotor blades) and a control system that generates an aerodynamic lift force that supports the weight of the helicopter, and the thrust that counteracts aerodynamic drag in forward flight. Each main rotor may be mounted on a vertical mast over the top of the helicopter. Due to tolerance stack-ups and variations in assembly, replacements or repairs, error may develop in the relationship between the control system and the rotor system. These errors include variations that "build up" in the dimensions of the various components and are problematic in excess, as the errors adversely impact a control system's ability to accurately command based on the components' incorrect positioning. Hence, utmost care is given to proper main rotor "rigging", that is to remove these tolerances and ensure precise alignment of the main rotor components relative to control system commands.

Among conventional main rotor rigging methods, one process involves an instrument, such as a digital inclinometer (i.e., a protractor) for measuring incline and decline tilt angles on pitch horns of a rotorcraft. Based on a predetermined rigging angle tolerance, an operator may adjust each associated control tube until the proper angle is achieved. However, this and other conventional methods are difficult to perform and consistently replicate due to the sensitivity of the equipment involved. For example, if the rotorcraft components are even minimally displaced, an angle modification would occur, and the rigging would have to be redone. Moreover, in known methods, rigging for accurate cyclic and collective control is performed separately with different rigging processes. Also, these methods can often take hours or even days to complete both measurement as well as accurate adjustment.

SUMMARY

According to one implementation of the present disclosure, a device to verify main rotor swashplate positioning includes an inner surface of a first section and a gradient surface of a second section. The gradient surface of the second section may have a plurality of graduation indications.

According to another implementation of the present disclosure, a method verifying main rotor swashplate positioning of a rotorcraft includes: providing a verification device; placing an inner surface of the verification device in contact with a convex curvature of a collective sleeve of a main rotor mast; placing at least one of an upper and lower surface of the verification device in contact with a corresponding flange of the collective sleeve; rotating the verification device around the collective sleeve; contacting a swashplate lug of the main rotor swashplate by a gradient surface of the verification device; measuring, by a plurality of graduation indications on the gradient surface, a height of the swashplate lug; and evaluating if the measured height is within an acceptable range.

According to another implementation of the present disclosure, a method verifying main rotor rigging of a rotorcraft includes: determining, using a verification tool, whether first, second, and third swashplate lugs of a swashplate assembly that are coupled to respective first, second, and third actuators assemblies are positioned according to a predetermined angle relative to a main rotor mast and at a predetermined collective height; adjusting adjustable rod ends coupled to the first, second, and third actuators assemblies; and determining, using the verification tool, whether the swashplate lugs of the swashplate assembly are positioned according to the predetermined angle relative to the main rotor mast and at the predetermined collective height.

The above-referenced summary section is provided to introduce a selection of concepts in a simplified form that are further described below in the detailed description section. Additional concepts and various other implementations are also described in the detailed description. The summary is not intended to identify key features or essential features of the claimed subject matter, nor is it intended to be used to limit the scope of the claimed subject matter, nor is it intended to limit the number of inventions described herein. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

FIG. 5 is a flowchart of a method in accordance with implementations of various techniques described herein.

FIG. 6 is a flowchart of a method in accordance with implementations of various techniques described herein.

DETAILED DESCRIPTION

In one or more examples of the present disclosure, verification devices 100, 200 and methods 600, 700 allow for efficient and accurate main rotor rigging, and more specifically, main rotor swashplate (i.e., swashplate assembly) and actuators assemblies (i.e., hydraulic actuators assemblies) alignment in rotorcrafts.

Advantageously, the inventive devices and methods allow for rigging for both cyclic control (i.e., corresponding to the pitch of a swashplate) and collective control (i.e., corresponding to the height of a swashplate) concurrently. In one implementation, verification may be performed by determining positionings on each main rotor swashplate lug of a rotorcraft, and in response to the determinations, making adjustments, if necessary, to the corresponding adjustable rod ends. Advantageously, the adjustment of the adjustable rod ends ensures proper alignment of the main rotor hydraulic actuators assemblies and main rotor swashplate based on a particular control input.

Also, example implementations allow for the determination of maximum acceptable location ranges for each actuators assembly individually, as well as the maximum total acceptable location ranges between one actuators assembly to another actuators assembly. In addition, the inventive devices and methods herein can confirm whether the main rotor swashplate of the rotorcraft is positioned perpendicular to a vertical mast of the rotorcraft and is at a predetermined collective height corresponding to a control input.

In some implementations, the main rotor control systems may be fly-by-wire systems where hydraulic actuators assemblies may be commanded by triple redundant flight control computers. The hydraulic actuators assemblies may be electrically and hydraulically triplex with pistons (i.e., cylinders, control rods) in parallel. However, the outputs are mechanically summed as part of the actuators assemblies. Each of the actuators assemblies may be directly attached to the swashplate assembly. One skilled in the art will also appreciate that the invention described herein may also be employed with conventional mechanical or mechanical-hydraulic control systems.

The main rotor control system may include a rise/fall swashplate assembly that is coupled to three triplex actuators. The swashplate assembly may be configured to provide full collective and cyclic pitch controls.

Figure 1:
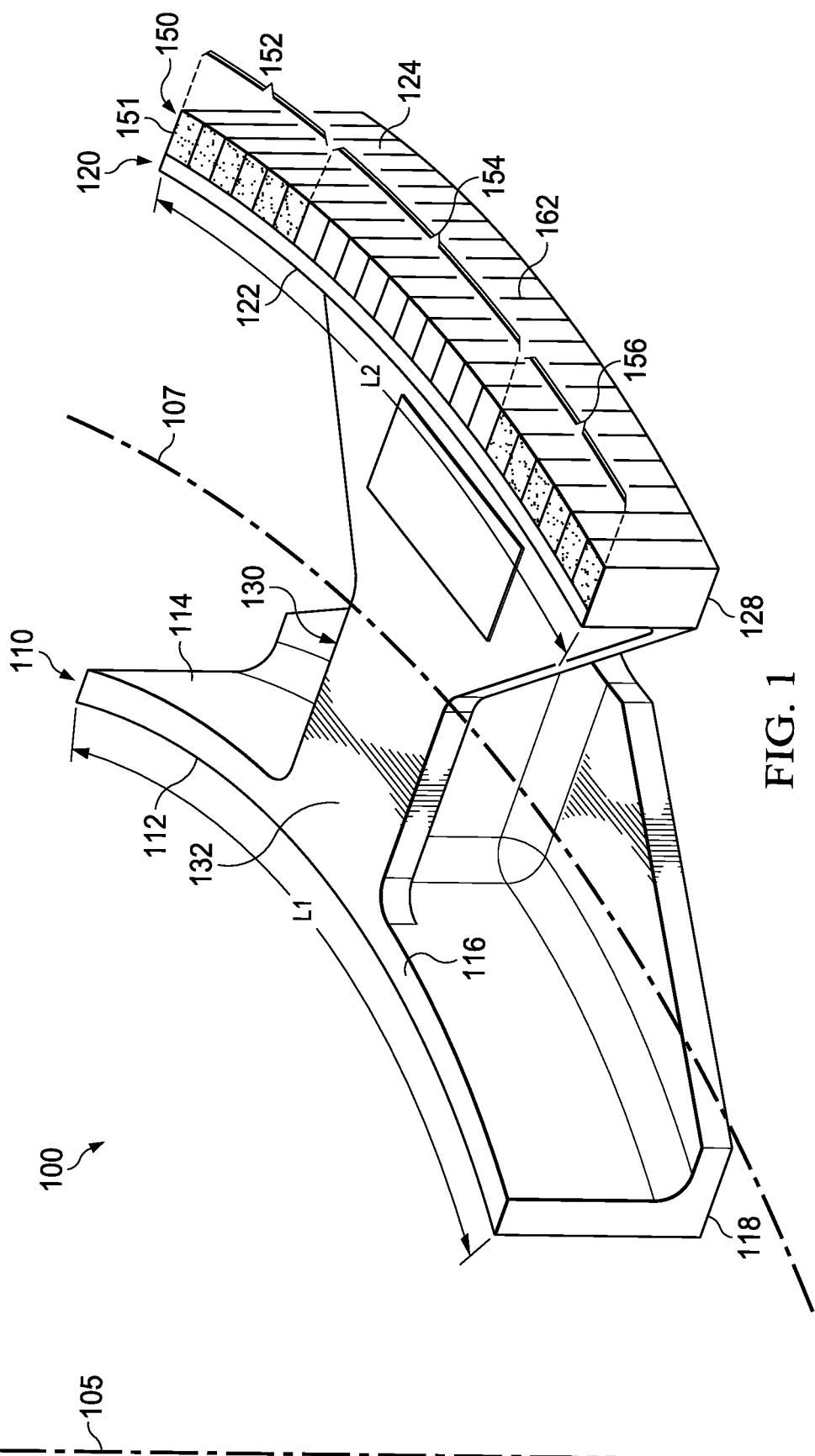
FIG. 1 illustrates a perspective view of a verification tool in accordance with implementations of various techniques described herein.
Figure 3:
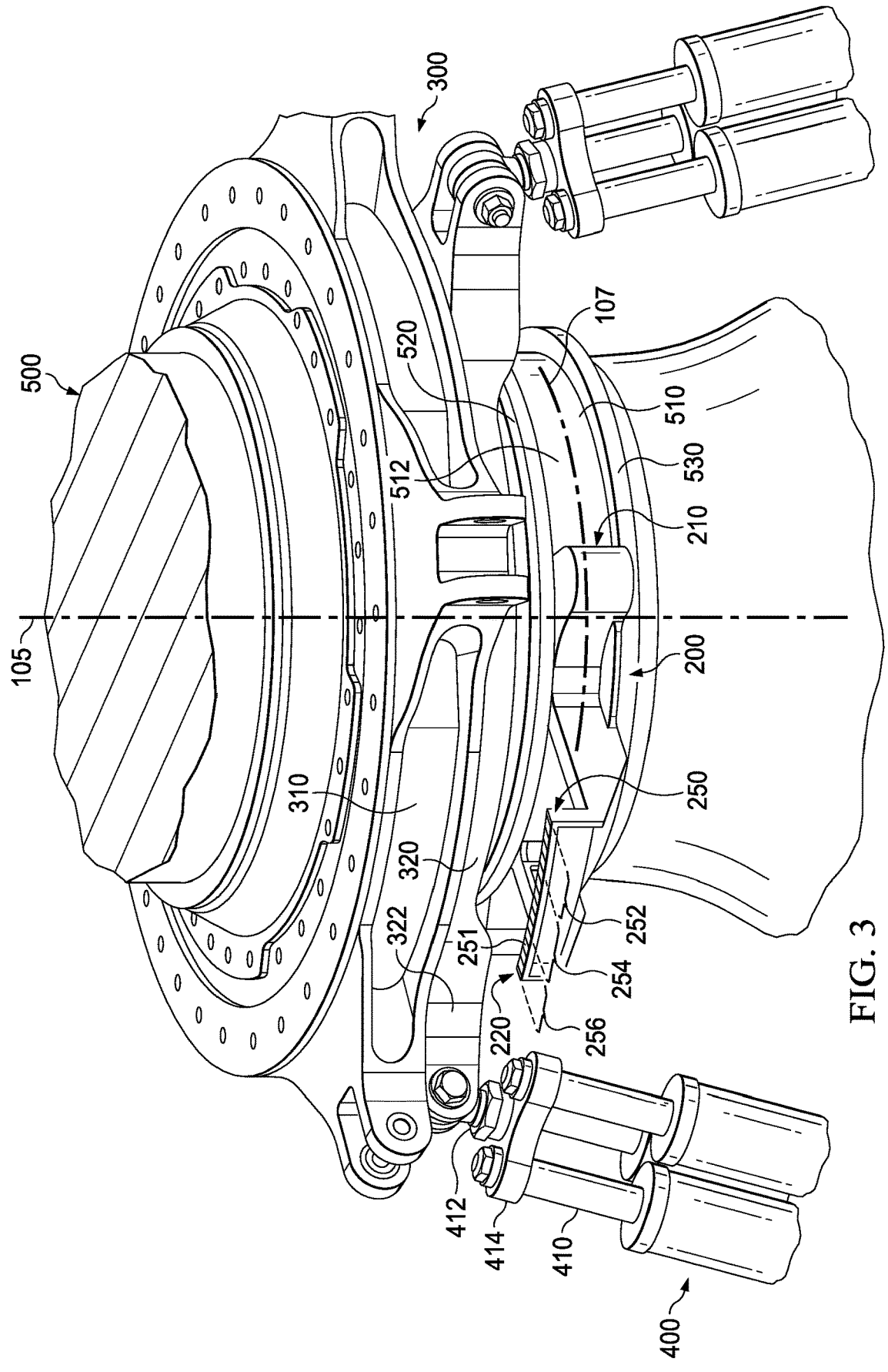
FIG. 3 illustrates a perspective view of a verification tool in accordance with implementations of various techniques described herein.
Figure 4:
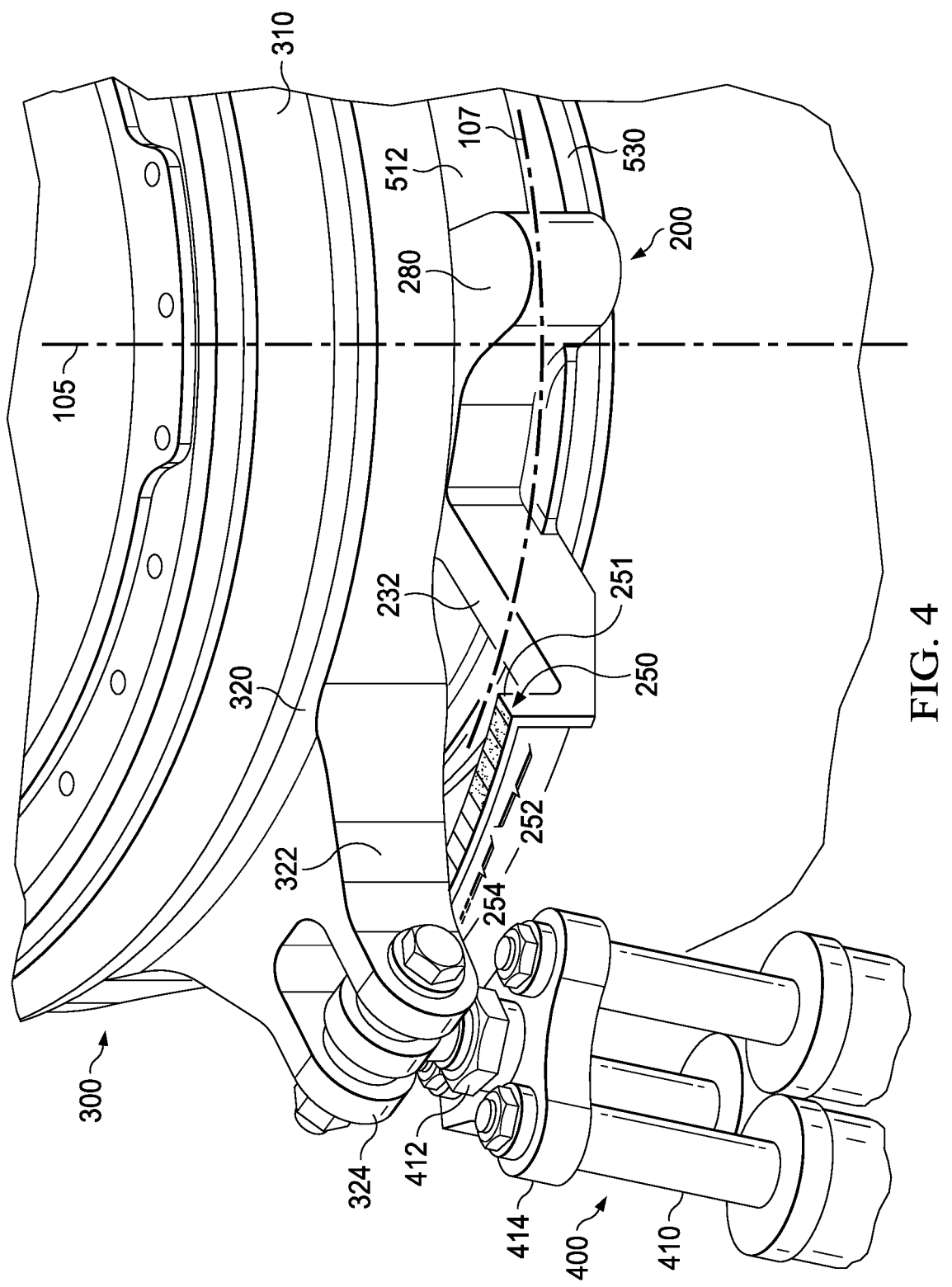
FIG. 4 illustrates a perspective view of a verification tool contacting a swashplate lug in accordance with implementations of various techniques described herein.

Referring to FIG. 1, a device 100 (i.e., verification tool, verification device) for verifying main rotor swashplate positioning is shown. The verification tool 100 may include a first section 110 (i.e., a first curved portion, a first curved section), a second section 120 (i.e., a second portion, a second curved section), and an adjoining section 130. In some implementations, the first section 110 may be substantially parallel to the second section 120. Additionally, the first and second sections 110, 120 may be parallel and concentric relative to a central axis 105 (i.e., a mast axis) of a mast 500 (i.e., a main rotor mast) (e.g., a vertical mast) (as shown in FIGS. 3 and 4) of a rotorcraft. In other implementations, the first and second sections 110, 120 are not substantially parallel to one another. In such cases, the first section 110 may be arranged as generally concentric relative to the central axis 105 of the mast 500, but not parallel and concentric relative to the second section 120. Advantageously, the verification tool 100 may be made of any stable material that is machinable within a given tolerance (e.g., steel, aluminum, etc.). More specifically, inner curved surface 112 (as described below in more detail) may be arranged as concentric to central axis 105. One skilled in the art will readily appreciate that, alternatively, the verification tool 100 may be made of from other materials (e.g., composites, ceramics, sheet metal, etc.) and from a number of manufacturing methods (e.g., composite lay-up, injection molding, stamping, etc.).

In some embodiments, the first section 110 may include an inner curved surface 112 (i.e., a concave surface, an inner surface, a first surface) (not shown), an outer surface 114 (i.e., an outer surface, a second surface), an upper surface 116 (i.e., a third surface), and a lower surface 118 (i.e., a fourth surface). In one instance, the inner surface 112 may be configured to "net out on" or "nest against" a curvature 512 (i.e., a convex curvature, a curved surface, a diameter) of a collective sleeve 510 of the mast 500 (e.g., as shown in FIGS. 3-4). In such an instance, a radius of a curvature for the inner surface 112 may be substantially equal to a radius of the curvature 512 of the collective sleeve 510. Also, in one example, the upper surface 116 may be configured to contact the upper flange 520, in order to position the device 100 for use. In another example, the lower surface 118 may be configured to contact the lower flange 530, in order to position the device 100 for use. In other examples, both the upper and lower surfaces 116, 118 may be configured to contact the upper and lower flanges 520, 530, respectively, in order to position the device 100 for use.

In some embodiments, the upper and lower surfaces 116, 118 of the first section 110 may be substantially perpendicular to the inner surface 112 of the first section 110. In other embodiments, one of the upper and lower surfaces 116, 118 of the first curved section 110 may be substantially perpendicular to the inner surface 112 of the first curved section 110.

In one implementation, the positioning along the convex curvature 512 of the collective sleeve 510 and between the upper and lower flanges 520, 530 allow for an accurate determination of main rotor swashplate positioning and an accurate determination of swashplate lug (e.g., swashplate lug 322 as shown in FIGS. 3-4) measurement.

In some embodiments, the second section 120 may include an inner surface 122, an outer surface 124, a gradient surface 150 (i.e., an upper surface), and a lower surface 128. In examples where the second section 120 is a curved section, some or all of its surfaces may also be curved surfaces. In other examples, the surfaces of the second section are not curved.

In a particular example, the inner surfaces 112, 122 of the first and second sections 110, 120 may define a travel arc 107, which lies in a horizontal plane and is concentric with the inner surfaces 112, 122. The travel arc 107 defines a radius of curvature along which the device 100 may be configured to rotate along in order to verify main rotor rigging and main rotor swashplate positioning. The travel arc 107 may be equidistant from both the inner curved surface 112 of the first curved section 110 and the inner surface 122 of the second section 120. Moreover, similar to the first and second sections 110, 120, the travel arc 107 may be concentric to and may rotate around the central axis 105 that follows the height of the mast 500. Hence, the travel arc 107 may be parallel to both the inner surfaces 112, 122 of the first and second curved sections 110, 120. In another example, the inner surface 112 of the first section 110 may define the travel arc 107, but not the inner surface 122 of the second section 120. In such an instance, the travel arc 107 may be parallel to the inner surface 112 of the first section 110, but not the inner surface 122 of the second section 120.

Figure 2:
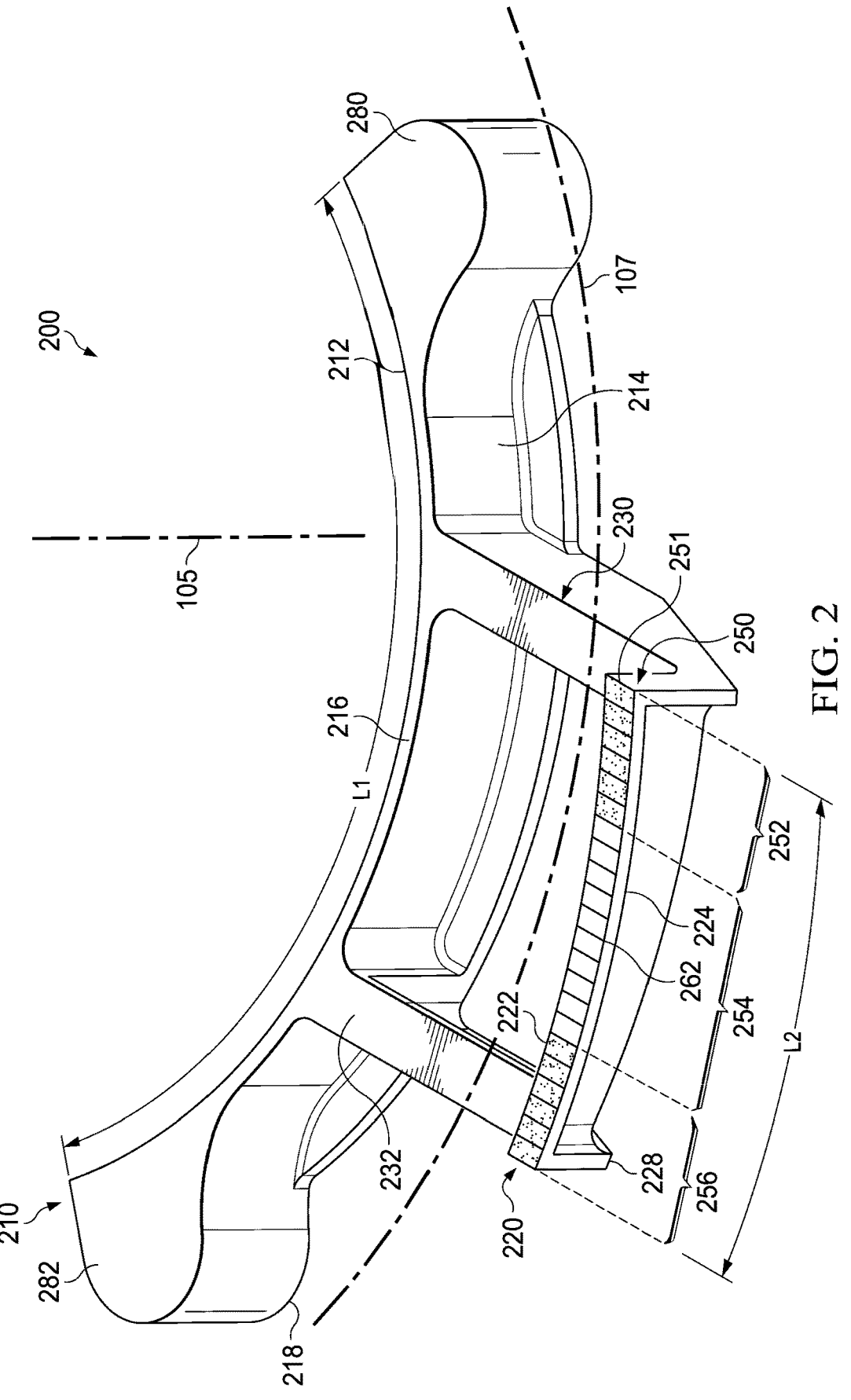
FIG. 2 illustrates a perspective view of a verification tool in accordance with implementations of various techniques described herein.

In one implementation (e.g., as shown in FIG. 1), a first length (L1) of the first curved section 110 may be of a substantially equivalent length as that of a second length (L2) of the second section 120. In another implementation (e.g., as shown in FIG. 2), the first length (L1) may be greater than the second length (L2). In a third implementation (not shown), the first length (L1) may be less than the second length (L2). Moreover, in certain cases, the first and second lengths (L1, L2) may be substantially parallel.

As mentioned herein, the term "parallel", as applied to lengths, surfaces, and/or sections, shall be defined as lengths, surfaces, and/or sections progressing so that the interval between them remains the same, within an applicable manufacturing tolerance. For example, the first curved section 110 as being parallel to the second curved section 120 are included in respective geometric plane curves that are parallel in space within an applicable manufacturing tolerance.

In a particular implementation, the lower surface 118 of the first curved section 110 may be configured "to net out on", or "nest against", the lower flange 530, while the upper surface 116 may be configured to "net out on," or "nest against" the upper flange 520. Moreover, in some embodiments, the lower surface 118 of the first section may extend outward in the direction toward the second section 120. In such embodiments, the lower surface 118 may include portions that are perpendicular to the upper surface 116. Also, the lower surface 118 may be configured to be substantially parallel to the lower flange 520 of the mast 500.

As shown in FIG. 1, the adjoining section 130 may include an adjoining surface 132. In certain implementations, the adjoining surface 132 may be substantially perpendicular to the inner surface 112 of the first section 110. In such cases, the adjoining surface 130 may adjoin one of: the upper surface 116, the lower surface 118, or the outer surface 114 of the first section 110 to the inner surface 122 or the lower surface 118 of the second section 120.

The second curved section 120 may comprise the gradient surface 150 (i.e., a ramp, an incline, or a series of incremental steps) having a plurality of graduation indications 151. In some implementations (e.g., as shown in FIG. 1), the gradient surface 150 may include a slope. For example, in such cases, each of the plurality of graduation indications 151 may be machined (e.g., cut, shaped, or finished) or marked (e.g., etched or painted) on the slope. In other cases, the gradient surface 150 may include a series of incremental steps (i.e., a plurality of incremental steps). In these instances, each of the plurality of incremental steps may correspond to an interval width of each graduation indication of the plurality of graduation indications 151.

In one example, each graduation indication of the plurality of graduation indications (i.e., increments) 151 may include a height increment of exactly or approximately 0.025 inches. The height increment for each of the plurality of graduation indications 151 may define a vector that is substantially parallel to the central axis 105. Also, each interval width of the plurality of graduations may be evenly spaced.

The plurality of graduation indications 151 may include (i.e., may be grouped into) at least three ranges: a first range 152, a second range 154, and a third range 156. The first and third ranges 152 and 156 indicate height increments that are outside a range of acceptable swashplate height. In one example, the first and third ranges 152, 156 may be designated by the color "red". In other examples, the first and third ranges 152, 156 may be designated by a different color. In a particular implementation, each of the first and third ranges 152, 156 include six graduation indications 151. The second range 154 indicates increments that are within the range of acceptable swashplate height. In one example, the second range 154 may be designated by the color "green". In other examples, the second range 154 may be designated by a different color. In the particular implementation, the second range 154 includes ten graduation indications 151. In other instances, the first, second, and third ranges 152, 154, 156 include varying numbers of different graduation indications 151. At the center of the second range 154, between the fifth and sixth graduation indications, is a midpoint 162 of the increments. According to certain methods, the midpoint 162 may be the ideal increment height for main rotor swashplate 300 and actuators assembly's 400 positioning (as shown in FIGS. 3 and 4). In some implementations, each of the plurality of graduation indications 151 may be indexed to corresponding portions of a swashplate lug 322 (as shown in FIGS. 3 and 4).

Referring to FIG. 2, a device 200 (i.e., verification tool, verification device) for verifying main rotor swashplate positioning is shown. The verification tool 200 may include a first section 210 (i.e., a first curved portion, a first curved section), a second section 220 (i.e., a second portion, a second curved section), and an adjoining section 230. In some implementations, the first section 210 may be substantially parallel to the second section 220. Additionally, the first and second sections 210, 220 may be parallel and concentric relative to a central axis 105 (i.e., a mast axis) of the mast 500 (i.e., a main rotor mast) (e.g., a vertical mast) (as shown in FIGS. 3 and 4) of a rotorcraft. In other implementations, the first and second sections 210, 220 are not substantially parallel to one another. In such cases, the first section 210 may be arranged as generally concentric relative to the central axis 105 of the mast 500, but not parallel and concentric relative to the second section 220. Advantageously, the verification tool 100 may be made of any stable material that is machinable within a given tolerance (e.g., steel, aluminum, etc.). More specifically, inner curved surface 212 (as described below in more detail) may be arranged as concentric to central axis 105. One skilled in the art will readily appreciate that, alternatively, the verification tool 200 may be made of from other materials (e.g., composites, ceramics, sheet metal, etc.) and from a number of manufacturing methods (e.g., composite lay-up, injection molding, stamping, etc.).

Similar to FIG. 1, in some embodiments, the first section 210 may include an inner curved surface 212 (i.e., a concave surface, a first surface) (not shown), an outer surface 214 (i.e., an outer curved surface, a second surface), an upper surface 216 (i.e., a third surface), and a lower surface 218 (i.e., a fourth surface). In one instance, the inner surface 212 may be configured to "net out on" or "nest against" a convex curvature 512 (i.e., a curved surface, a diameter) of the collective sleeve 510 of the mast 500 (e.g., as shown in FIGS. 3-4). In such an instance, a radius of a curvature for the inner surface 112 may be substantially equal to a radius of the curvature 512 of the collective sleeve 510. As an example, the upper surface 216 may be configured to contact the upper flange 520, in order to position the device 200 for use. In another example, the lower surface 218 may be configured to contact the lower flange 530, in order to position the device 200 for use. In other examples, both the upper and lower surfaces 216, 218 may be configured to contact the upper and lower flanges 520, 530, respectively, in order to position the device 100 for use.

In some embodiments, the upper and lower surfaces 216, 218 of the first section 210 may be substantially perpendicular to the inner surface 212 of the first curved section 110. In other embodiments, one of the upper and lower surfaces 216, 218 of the first curved section 210 may be substantially perpendicular to the inner surface 212 of the first curved section 210.

In one implementation, the positioning along the convex curvature 512 (i.e., curved surface) of the collective sleeve 510 and between the upper and lower flanges 520, 530 allow for an accurate determination of main rotor swashplate positioning and an accurate determination of swashplate lug (e.g., swashplate lug 322 as shown in FIGS. 3-4) measurement.

In some embodiments, the second section 220 may include an inner surface 222, an outer surface 224, a gradient surface 250 (i.e., an upper surface), and a lower surface 228. In examples where the second section 220 is a curved section, some or all of its surfaces may also be curved surfaces. In other examples, the surfaces of the second section are not curved.

In a particular example, the inner surfaces 212, 222 of the first and second sections 210, 220 may define a travel arc 107, which lies in a horizontal plane and is concentric with the inner surfaces 212, 222. The travel arc 107 defines a radius of a curvature along which the device 200 may be configured to rotate along in order to verify main rotor rigging and main rotor swashplate positioning. The travel arc 107 may be equidistant from both the inner curved surface 212 of the first curved section 210 and the inner section 222 of the second section 220. Moreover, similar to the first and second sections 210, 220, the travel arc 107 may be concentric to and may rotate around the central axis 105 that follows the height of the mast 500. Hence, the travel arc 107 may be parallel to both the inner surfaces 212, 222 of the first and second curved sections 210, 220. In another example, the inner surface 212 of the first section 210 may define the travel arc 107, but not the inner surface 222 of the second section 220. In such an instance, the travel arc 107 may be parallel to the inner surface 212 of the first section 110, but not the inner surface 222 of the second section 220.

As mentioned herein, the term "parallel", as applied to lengths, surfaces, and/or sections, shall be defined as lengths, surfaces, and/or sections progressing so that the interval between them remains the same, within an applicable manufacturing tolerance. For example, the first curved section 210 as being parallel to the second curved section 220 are included in respective geometric plane curves that are parallel in space within an applicable manufacturing tolerance.

As illustrated in FIG. 2, the first section 210 may include first and second handles 280, 282 on opposing ends of the first section 210. Advantageously, the first and second handles 280, 282 may allow for ease in the correct positioning and handling of the device 200.

In a particular implementation, the lower surface 218 of the first curved section 210 may be configured "to net out on", or "nest against", the lower flange 530, while the upper surface 216 may be configured to "net out on," or "nest against" the upper flange 520. Moreover, in some embodiments, the lower surface 218 of the first section may extend outward in the direction toward the second section 220. In such embodiments, the lower surface 218 may include portions that are perpendicular to the upper surface 216. Also, the lower surface 218 may be configured to be substantially parallel to the lower flange 520 of the mast 500.

As shown in FIG. 2, the adjoining section 230 may include one or more adjoining surfaces 232. In certain implementations, the one or more adjoining surfaces 232 may be substantially perpendicular to the inner surface 212 of the first section 210. In such cases, the one or more adjoining surfaces 232 may adjoin one or more of: the upper surface 216, the lower surface 218, or the outer surface 214 of the first section 210 to the inner surface 222 or the lower surface 228 of the second section 220.

The second curved section 220 may comprise the gradient surface 250 (i.e., a ramp, an incline, or a series of incremental steps) having a plurality of graduation indications 251. In some implementations (e.g., as shown in FIG. 2), the gradient surface 250 may include a slope. For example, in such cases, each of the plurality of graduation indications

251 may be machined (e.g., cut, shaped, or finished) or marked (e.g., etched or painted) on the slope. In other cases, the gradient surface 250 may include a series of incremental steps (i.e., a plurality of incremental steps). In these instances, each of the plurality of incremental steps may correspond to an interval width of each graduation indication of the plurality of graduation indications 251.

In one example, each graduation indication of the plurality of graduation indications (i.e., increments) 251 may include a height increment of exactly or approximately 0.025 inches. The height increment for each of the plurality of graduation indications 251 may define a vector that is substantially parallel to the central axis 105. Also, each interval width of the plurality of graduations may be evenly spaced.

The plurality of graduation indications 251 may include (i.e., may be grouped into) at least three ranges: a first range 252, a second range 254, and a third range 256. The first and third ranges 252 and 256 indicate height increments that are outside a range of acceptable swashplate height. In one example, the first and third ranges 252, 256 may be designated by the color "red". In other examples, the first and third ranges 252, 256 may be designated by a different color. In a particular implementation, each of the first and third ranges 252, 256 include six graduation indications 251. The second range 254 indicates increments that are within the range of acceptable swashplate height. In one example, the second range 254 may be designated by the color "green". In other examples, the second range 254 may be designated by a different color. In the particular implementation, the second range 254 includes ten graduation indications 251. In other instances, the first, second, and third ranges 252, 254, 256 include varying numbers of different graduation indications 251. At the center of the second range 254, between the fifth and sixth graduation indications, is a midpoint 262 of the increments. According to certain methods, the midpoint 262 may be the ideal increment height for main rotor swashplate 300 and actuators assembly's 400 positioning (as shown in FIGS. 3 and 4). In some implementations, each of the plurality of graduation indications 251 may be indexed to corresponding portions of a swashplate lug 322 (as shown in FIGS. 3 and 4).

Referring to FIG. 3, a perspective view of the positioning of a device (e.g., such as one of the verification tools 100, 200 as described with reference to FIGS. 1 and 2) relative to a swashplate assembly 300, actuators assembly 400, and the mast 500 is shown.

In operation, the swashplate assembly 300 may translate input via rotorcraft flight controls (i.e., control input, pilot commands) that is provided to actuators assembly 400 into motion of the main rotor blades. As illustrated, the swashplate assembly 300 includes two concentrically oriented rings, an upper swashplate 310 (i.e., a rotating ring) and a lower swashplate 320 (i.e., a nonrotating ring). The upper swashplate 310 may be rotatable with a main rotor of a rotorcraft. For example, as the rotating ring, the upper swashplate 310 may be coupled via pitch links to pitch arms of rotor blades (not shown). In contrast, the lower swashplate 320 may be non-rotating and is coupled to actuators assembly 400.

Rotorcrafts may include at least three flight control inputs: a cyclic control for lateral and longitudinal cyclic pitch control, a collective control for collective pitch control, and an anti-torque control. As an example, for cyclic control (i.e., to change a rotorcraft's roll and pitch), the swashplate assembly 300 can be tilted relative to the horizontal plane by raising and lowering various points of the upper swashplate 310, as the upper swashplate 310 rotates cyclically. As a result, a cyclic pitch may be introduced, as a pitch angle of a particular rotor blade would change with main rotor rotation. Additionally, to alter collective pitch control of main rotor blades, the swashplate assembly 300, as a whole, can be raised or lowered vertically, changing the pitch angle of all of the rotor blades together by a substantially equal amount.

The actuators assembly 400 can utilize hydraulic power to facilitate mechanical operation of the swashplate assembly 300 and the pitch links that are coupled to the rotor blades. For example, for cyclic control, the actuators assembly 400 may tilt the swashplate assembly 300 in response to control inputs. Also, for collective pitch control, the actuators assembly 400 may effectuate movement of the swashplate assembly 300 higher and lower along the central axis 105 without changing an orientation of the cyclic controls.

As best illustrated in FIG. 4, the actuators assembly 400 may be adjoined to a swashplate clevis 324 of the lower swashplate 320 by an adjustable rod end 412 (which may include, e.g., a jam nut). The adjustable rod end 412 may be coupled to control rods 410 (i.e., piston/cylinder assemblies) at or near yoke 414 of the actuators assembly 400. The adjustable rod end 412 allows that actuators assembly 400 to be configured to a precise length for main rotor rigging. In an example rigging operation, the adjustable rod end 412 may be adjusted (by a separate torque tool) in half turn (i.e., half-revolution) increments, where each half-turn is 0.025 inches. Hence, the number of half turn adjustments to be made is equal to the graduation indication 251 in order that the corresponding swashplate lug's measurement falls within the second range 254.

Referring to FIG. 4, a perspective view of contact between a verification device (such as verification tools 100, 200 shown in FIGS. 1 and 2) relative to the swashplate assembly 300, and the actuator assemblies 400 is shown.

The following is an example verification operation of main rotor swashplate positioning of a rotorcraft. The verification device 100, 200 may rotate along travel arc 107 around the collective sleeve 510 between the upper and lower flanges 520, 530 of the mast 500. At the outset, to align for correct initial positioning, the inner surface 112, 212 (of the first section 110, 220) is held in contact with the curved surface 512 of the collective sleeve 510. Further, the upper surface 116, 216 is held in contact with the upper flange 520. In addition, or as an alternative, the lower surface 118, 218 is held in contact with the lower flange 530. The verification device 100, 200 is configured to move in rotation about central axis 105 and along the travel arc 107. Upon rotation, contact (i.e., intersection) is made between the gradient surface 150, 250 of the verification device 100, 200 and indexable portions of the swashplate lug 322. After contact is made, the device 100, 200 provides an indication of the height measurement based on the graduation indication 151, 251 where contact with the swashplate lug 322 has occurred. Subsequently, an evaluation may be made as to whether the measured height is within an acceptable range (e.g., a second range 154, 254) of the verification device 100, 200. If the detected measured contact is within the second range 154, 254, the main rotor swashplate positioning is deemed proper. However, if the detected measured contact is within the first or third ranges 152, 156, 252, 256, the main rotor swashplate positioning is deemed improper, and appropriate adjustment of the actuator end 412 may be required. In one implementation, adjustments may be made by loosening the actuator rod end 412 (e.g., a jam nut) of the actuators assembly 400 by a separate torque tool. The actuator rod end 412 may be adjusted in half-turn (i.e., half-revolutions) increments, where each half-turn is 0.025 inches. Accordingly, the number of half turn adjustments to be made is equal to the number of graduation indications 151, 251 that corresponds to the desired adjustment, in order that the swashplate lug 322 contacts the verification device 100, 200 somewhere within the second range 154, 254.

The following is an example of a verification and adjustment operation of main rotor rigging of a rotorcraft. Prior to commencing the operation, the verification device, along with aircraft mating surfaces, including the collective sleeve 510, the upper and lower flanges 520, 530, and the swashplate lug 322 are cleaned to remove grease, oil, dirt, and other particulates. Also, this example assumes that sufficient hydraulics and power is provided to the rotorcraft from maintenance equipment, and that flight control systems (e.g., cyclic stick, collective lever, or fly-by-wire cyclic and collective controls) are configured such that a level swashplate condition is commanded.

To begin, a first determination is made whether first, second, and third swashplate lugs (one of which is shown in FIG. 4 by the representative swashplate lug 322) of a swashplate assembly 300 that are coupled to respective first, second, and third actuators assemblies (one of which is shown in FIG. 4 by the representative actuators assembly 400) are positioned according to a predetermined angle relative to the mast 500 (e.g., substantially perpendicular to the mast 500 within approximately 0.5 degrees) and at a predetermined collective height. The predetermined collective height may be provided by a rigging specification/manual associated with the particular rotorcraft. One skilled in the art will appreciate that alternative geometries of swashplate lugs are possible, and, therefore, the desired angle between the mast 500 and swashplate lug 322 maybe different in different applications.

For each of the respective swashplate lugs (and their corresponding actuators assemblies), the verification tool 100, 200 is initially positioned such that an inner surface 112, 212 (of the first section 110) is held in contact with the curved surface 512 of the collective sleeve 510 between the upper and lower flanges 520, 530 of the mast 500. Also, in the initial positioning, the upper surface 116, 216 is held in contact with the upper flange 520. In addition, or as an alternative, the lower surface 118, 218 is held in contact with the lower flange 530. After the initial positioning, the verification tool 100, 200 is held in contact with the collective sleeve 510, while being rotated about central axis 105, along the travel arc 107 until contact is made with the respective swashplate lug.

Next, upon contact, the verification tool 100, 200 is used to measure the respective heights of each of the swashplate lugs. To do so, measurements (i.e., indexing) are taken as to where on the gradient surface 150, 250 of the verification tool 100, 200, contact for each of the swashplate lugs has occurred. If the measured contact for each the first, second, and third swashplate lugs has occurred within a predetermined number of graduations of one another (e.g., the measured contacts on the verification tool 100, 200 are no more than five graduations apart) and each of the swashplate lug measurements is detected to be inside the second range 154, 254 of the gradient surface 150, 250 of the verification tool 100, 200, the main rotor swashplate assembly 300 is substantially normal to the mast 500 and the main rotor rigging of the rotorcraft is deemed acceptable. One skilled in the art will appreciate that the "predetermined number of graduations" may vary according to different embodiments, depending on the geometry of the tool 100, 200, the slope of the gradient surface 150, 250, the height of the graduation indications 151, 251, and the aircraft requirements.

However, if the measurement for any of the three swashplate lugs is detected to be in the first or third ranges 152, 156, 252, 256, i.e., at a height that corresponds to a graduation indication 151, 251 outside the range of acceptable swashplate height, adjustments of actuators assemblies may be required. Similarly, if the swashplate lugs are more than a predetermined number of graduations apart (e.g., five graduations) one of the actuators assemblies would be at a greater height than another, thus tilting the swashplate assembly 300 and impacting blade angles. Consequently, control margins may be lost resulting in an improper execution of flight control commands.

In one implementation, an adjustment may be made by loosening an actuator rod end (e.g., actuator rod end 412) (e.g., a jam nut) of a respective actuators assembly by a separate torque tool. The actuator rod end may be adjusted in half-turn (i.e., half-revolutions) increments, where each half-turn is 0.025 inches. Accordingly, the number of half turn adjustments to be made is equal to the number of measurement graduation indications 151, 251 that corresponds to the desired adjustment, in order that the respective swashplate lug's measurement is located within the second range 154, 254 and within the predetermined number of graduations from the measurements of the other two swashplate lugs (e.g., the measured contacts on the verification tool 100, 200 are no more than five graduations apart). As such, adjustments may be made to at least one of the actuator assemblies. Subsequently, a second determination of measurements and evaluations using the verification tool 100, 200, in accordance with the above paragraphs herein, may again be performed on the first, second, and third swashplate lugs to verify proper main rotor rigging.

FIG. 5 is a flowchart of a method 600 of verifying at least one main rotor swashplate positioning of a rotorcraft, which was described above in detail with reference to the example verification operation of main rotor swashplate positioning. The flowchart is provided herein for additional support to the claims. Method 600 may be performed by a verification tool (e.g., a device such verification tools 100, 200 as described with reference to FIGS. 1 and 2), the swashplate assembly 300, the actuators assembly 400, and the mast 500 of FIGS. 1-4.

At 602, method 600 includes providing for a verification device. For example, as described with reference to FIGS. 1-4, a verification device, such as verification tool 100 or verification tool 200 may be provided.

At 604, an inner surface of the verification device is placed in contact with a convex surface of a collective sleeve of a main rotor mast. For example, as described with reference to FIGS. 1-4, an inner surface 112, 212 (i.e., a concave surface) of the verification device 100 may be positioned on a curved surface 512 (i.e., a convex surface) of a collective sleeve 510 of a main rotor mast 500.

At 606, at least one of an upper or lower surface of the verification device is placed in contact with a corresponding flange of the collective sleeve. For example, as described with reference to FIGS. 1-4, at least one of an upper surface 116, 216 or lower surface 118, 218 may be placed in contact with a corresponding flange, the upper flange 520 or 530, respectively, of the collective sleeve 510.

At 608, the verification device may be rotated around the collective sleeve of the mast. For example, as described with reference to FIGS. 1-4, the verification device 100, 200 may be rotated around the collective sleeve 510 of the main rotor mast 500.

At 610, a swashplate lug of the main rotor swashplate is contacted by a gradient surface of the verification device. For example, as described with reference to FIGS. 1-4, a swashplate lug 332 of the swashplate assembly 300 may be contacted by the gradient surface 150, 250 of the verification device 100, 200.

At 612, the swashplate lug height is measured by a plurality of graduation indications on the gradient surface of the verification device. For example, as described with reference to FIGS. 3-4, the swashplate lug 332 may be measured by a plurality of graduation indications 151, 251 on the gradient surface 150, 250 of the verification device 100, 200.

At 614, an evaluation is made whether the measured height is within an acceptable range of the verification device. For example, as described with reference to FIGS. 1-4, an evaluation is made whether the height of the measured contact is detected on the second range 152, 252 of the gradient surface 150, 250 of the verification device 100, 200. The second range 152, 252 may include graduation indications that are within the range of acceptable swashplate height.

At 616, one or more actuators assemblies are adjusted based on the evaluation of the measured height. For example, as described with reference to FIG. 4, an actuators assembly 400 may be adjusted based on the evaluation of the measured height for a particular actuators assembly falling out of the acceptable range alone, or with respect to the measurements of the other actuators assemblies.

Moreover, upon verifying one particular rotor swashplate positioning of a rotorcraft, the above steps 602 to 616 may be repeated for additional swashplate lugs to complete the rigging and the verifying of the main rotor in accordance with the example verification and adjustment operation of main rotor rigging of a rotorcraft (as described in detail in above paragraphs and further described below in FIG. 6).

FIG. 6 is a flowchart of a method 700 of verifying main rotor rigging of a rotorcraft, which was described above in detail with reference to the example verification and adjustment operation of main rotor rigging of a rotorcraft. The flowchart is provided herein for additional support to the claims. Method 700 may be performed by a verification tool (e.g., a device such verification tools 100, 200 as described with reference to FIGS. 1 and 2), a torque tool (not shown), the swashplate assembly 300, at least three hydraulic actuators assemblies (e.g., as described by representative actuators assembly 400), and the mast 500.

At 702, method 700 includes a first determination, using a verification tool, whether first, second, and third swashplate lugs of a swashplate assembly (that are coupled to respective first, second, and third actuators assemblies) are positioned at a predetermined angle relative to a main rotor mast (e.g., substantially normal to a main rotor mast) and at a predetermined collective height. For example, as described with reference to FIGS. 1-4, the verification tool 100, 200 may be used to determine whether first, second, and third swashplate lugs (as shown by the representative swashplate lug 322 in FIGS. 3-4) of a swashplate assembly 300 (that are coupled to respective first, second, and third actuators assemblies (as shown by the representative actuators assembly 400 in FIGS. 3-4)) are positioned substantially normal to a mast 500 and at a predetermined collective height.

At 704, in response to the first determination, adjustable rod ends coupled to the first, second, and third actuators assemblies may be adjusted. For example, in response to the first determination, adjustable rod ends (as shown by the representative adjustable rod ends 412 in FIGS. 3-4) coupled to the first, second, and third actuators assemblies (as shown by the representative actuators assembly 400 in FIGS. 3-4) may be adjusted.

At 706, a second determination is made, by the verification tool, whether the swashplate lugs are positioned according to the predetermined angle relative to the mast (e.g., substantially normal to the mast) and at the predetermined collective height. For example, as described with reference to FIGS. 1-4, the verification tools 100, 200 may be used to determine whether the swashplate lugs (as shown by the representative swashplate lug 322 in FIGS. 3-4) are positioned substantially normal to the mast 500 and at the predetermined collective height.

Each of the processes of illustrative methods 600 and 700 may be performed or carried out by a system integrator, a third party, and/or an operator (e.g., a customer). For the purposes of this description, a system integrator may include, without limitation, any number of manufacturers and major-system subcontractors; a third party may include, without limitation, any number of vendors, subcontractors, and suppliers; and an operator may be a leasing company, military entity, service organization, and so on.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according to the present disclosure are provided below.

Device(s) and method(s) shown or described herein may be employed during any one or more of the stages of the verification of swashplate positioning and/or main rotor rigging of the device 100, the device 200, the method 600, and the method 700.

Different examples of the device(s) and method(s) disclosed herein include a variety of components, features, and functionalities. It should be understood that the various examples of the device(s) and method(s) disclosed herein may include any of the components, features, and functionalities of any of the other examples of the device(s) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A device to verify main rotor swashplate positioning, comprising:
   a first section having a first inner surface configured to nest against a curvature of a mast;
   a second section having a surface having first, second and third ranges, each of which indicates whether a height range is within a range of acceptable swashplate height; and
   a travel arc defined by and concentric with the first inner surface of the first section.

2. The device of claim 1, further comprising:
   a second inner surface adjoined to and substantially perpendicular to the surface of the second section.

3. The device of claim 2, further comprising:
   an adjoining surface of an adjoining section substantially perpendicular to the first inner surface of the first section and the second inner surface of the second section,
   wherein the adjoining surface is contiguous between the first inner surface and the second inner surface.

4. The device of claim 3, further comprising:
   a lower surface substantially perpendicular to the first inner surface and configured to contact a flange of a collective sleeve of the mast.

5. The device of claim 3, further comprising:
   a handle.

6. The device of claim 5, further comprising:
   a lower surface substantially perpendicular to the first inner surface and configured to contact a flange of a collective sleeve of the mast.

7. The device of claim 1, wherein the surface of the second section is configured to contact a corresponding portion of a swashplate lug of a main rotor swashplate.

8. The device of claim 1, wherein each range comprises a plurality of graduation indications, and
   wherein each graduation indication corresponds to a height increment of at least 0.025 inches.

9. The device of claim 8, wherein each height increment defines a vector parallel to a mast axis.

10. The device of claim 1, wherein the surface of the second section comprises a plurality of incremental steps, each of the plurality of incremental steps having an interval width.

11. The device of claim 1, wherein the surface of the second section comprises a slope.

12. The device of claim 11, wherein each of the ranges is machined or marked on the slope.

13. The device of claim 1, wherein each of the first and third ranges includes a plurality of indications.

14. The device of claim 13, wherein the second range includes a plurality of indications.

15. The device of claim 2, wherein the first inner surface is curved.

16. The device of claim 15, wherein the travel arc is equidistant from both the first inner surface and the second inner surface.

17. The device of claim 15, wherein the device is monolithic.

18. The device of claim 15, wherein the travel arc is parallel to the first inner surface.

19. The device of claim 15, wherein the travel arc is parallel to the second inner surface.

20. The device of claim 18, wherein the travel arc is parallel to the second inner surface.

\* \* \* \* \*